US011882400B2

(12) United States Patent
Skramstad

(10) Patent No.: US 11,882,400 B2
(45) Date of Patent: Jan. 23, 2024

(54) DIRECTIONAL LOUDSPEAKER

(71) Applicant: NNNN AS, Årnes (NO)

(72) Inventor: Rune Skramstad, Drammen (NO)

(73) Assignee: NNNN AS, Årnes (NO)

( * ) Notice: Subject to any disclaimer, the term of this patent is extended or adjusted under 35 U.S.C. 154(b) by 232 days.

(21) Appl. No.: 17/623,309

(22) PCT Filed: Jun. 24, 2020

(86) PCT No.: PCT/NO2020/050174
§ 371 (c)(1),
(2) Date: Dec. 28, 2021

(87) PCT Pub. No.: WO2020/263101
PCT Pub. Date: Dec. 30, 2020

(65) Prior Publication Data

US 2022/0369027 A1 Nov. 17, 2022

(30) Foreign Application Priority Data

Jun. 28, 2019 (NO) .................................... 20190836

(51) Int. Cl.
*H04R 1/30* (2006.01)
*H04R 1/34* (2006.01)
*H04R 1/02* (2006.01)

(52) U.S. Cl.
CPC ............... *H04R 1/345* (2013.01); *H04R 1/02* (2013.01)

(58) Field of Classification Search
CPC .. H04R 1/2853; H04R 1/2857; H04R 1/2861; H04R 1/2865; H04R 1/30; H04R 1/32;
(Continued)

(56) References Cited

U.S. PATENT DOCUMENTS 2,310,243 A * 2/1943 Klipsch ................ H04R 1/2865 181/152
2,751,997 A * 6/1956 Gately, Jr. ............ H04R 1/2865 181/152

(Continued)

FOREIGN PATENT DOCUMENTS

DE 2832041 A1 * 1/1980
EP 3 018 915 B1 6/2018

(Continued)

OTHER PUBLICATIONS

NNNN AS,"Search Opinion for European Patent Application No. 20832394.9", dated Jun. 14, 2023, 3 pages.

(Continued)

*Primary Examiner* — Ryan Robinson
(74) *Attorney, Agent, or Firm* — F. Brent Nix, Esq.; Johnson, Marcou, Isaacs & Nix, LLC; Scott Hendrix, Esq.

(57) ABSTRACT

The present invention discloses directional loudspeaker at least comprising: a loudspeaker cabinet comprising: a folded horn with a length of minimum one quarter of a wavelength, λ, and the horn mouth opening is asymmetrically placed in a front baffle providing a physical delay between the different wraparound pathways to the rear side of the loudspeaker cabinet; one or more driver speakers loading the horn with an open rear chamber, the open rear chamber having at least two opening pathways with a distance there between providing a physical delay of a rear wave, the loudspeaker cabinet provides at least four pathways for in phase and out of phase signals, at least two pathways for the out of phase signal and at least two pathways for the in phase signal amplified by the horn.

8 Claims, 4 Drawing Sheets

(58) Field of Classification Search
CPC .......... H04R 1/323; H04R 1/34; H04R 1/345; H04R 1/347
See application file for complete search history.

(56) References Cited

U.S. PATENT DOCUMENTS

| | | | | | |
|---|---|---|---|---|---|
| 2,765,864 | A * | 10/1956 | Glenn | H04R 1/2865 181/151 |
| 2,822,884 | A * | 2/1958 | Simpson | H04R 1/2865 181/156 |
| 2,835,335 | A * | 5/1958 | Glassey | H04R 1/2865 181/152 |
| 2,986,229 | A * | 5/1961 | Perkins, Jr. | H04R 1/2865 181/199 |
| 3,047,090 | A * | 7/1962 | Pruden | H04R 1/30 181/152 |
| 3,112,006 | A * | 11/1963 | Roberts | H04R 1/2865 181/156 |
| 3,356,179 | A | 12/1967 | Tompkins | |
| 3,923,124 | A * | 12/1975 | Hancock | H04R 1/2865 181/152 |
| 4,251,687 | A * | 2/1981 | Deutsch | H04R 1/2865 381/337 |
| 4,340,778 | A * | 7/1982 | Cowans | H04R 1/2857 381/98 |
| 6,356,643 | B2 | 3/2002 | Yamagishi et al. | |
| 8,064,627 | B2 * | 11/2011 | Maeshiba | H04R 1/2865 381/345 |
| 8,094,855 | B2 * | 1/2012 | Clements | H04R 1/02 181/185 |
| 8,167,083 | B2 * | 5/2012 | Litovsky | H04R 1/02 181/146 |
| 2004/0003961 | A1 | 1/2004 | Gunness | |
| 2007/0215407 | A1 | 9/2007 | Chiang | |
| 2012/0186902 | A1 * | 7/2012 | Stewart, Jr. | H04R 1/2865 181/150 |
| 2013/0015014 | A1 | 1/2013 | Stewart et al. | |
| 2015/0382090 | A1 | 12/2015 | Bisset et al. | |
| 2015/0382103 | A1 | 12/2015 | Powell | |

FOREIGN PATENT DOCUMENTS

| | | | | |
|---|---|---|---|---|
| GB | 2273415 | A * | 6/1994 | H04R 1/2865 |
| GB | 2390518 | A | 1/2004 | |
| KR | 19990001536 | A * | 1/1999 | |
| KR | 101201073 | B1 * | 11/2011 | |
| WO | 2010/108123 | A1 | 9/2010 | |
| WO | WO-2018112231 | A1 * | 6/2018 | H04R 1/2811 |

OTHER PUBLICATIONS

NNNN AS,"International Search Report for PCT/NO2020/050174", dated Aug. 28, 2020, 2 pages.
NNNN AS, "Norwegian Search Report for priority application No. 20190836", dated Feb. 7, 2020, 2 pages.

* cited by examiner

DIRECTIONAL LOUDSPEAKER

TECHNICAL FIELD

The present invention relates to a directional loudspeaker.

BACKGROUND ART

The present invention relates generally to the field of professional, studio, cinema and high performance audio reproduction and the ability to control directivity; and, more particularly concerns infrabass, bass, midbass and midrange in scenarios where typically the speaker cabinet size is smaller than the wavelengths reproduced by the loudspeaker.

In the field of professional sound reinforcement there is a large need to be able to control directivity to avoid excessive sound levels where it is not needed. With controlled directivity it is possible to play loud towards spectators without disturbing the environment surrounding the event area. Another important aspect is increased feedback resistance when microphones are involved. The ability to achieve a more even frequency response over a larger area is also something that can be obtained by controlling and reduce overlap zones from different loudspeaker positions.

Early sound systems obtained controlled directivity towards low frequencies by their sheer size vs wavelengths while modern sound systems typically are based around smaller modules and signal processing to get the desired directivity.

The typical high performance large standalone horn speakers from the 1920's through the 1980's typically used large horn mouths and sometimes extra baffle walls to get directivity down towards low frequencies.

Large sound reinforcement low frequency systems from the 1970's through today often use a building block design by making a large subwoofer stack out of smaller modules where the combined total baffle size enables low frequency controlled directivity.

From about the 2000's array technology known from antenna theory, seismic, wave field synthesis and ultrasound beamforming has been transferred to professional sound reproduction. However the most typical use cases involves simple configurations like; gradient arrays or static end fire arrays. Gradient arrays typically uses different signal processing for each element in the array to achieve a cardioid dispersion pattern. The result is great with regards to dispersion control but the impulse response is stretched and sound quality suffers so much that most high level sound engineers have this option as a last resort. A slightly better version of this uses a 2:1 configuration of the concept where two drivers are pointing forwards and one driver is pointing rearwards, in this configuration the rear wave contribution in the front is 6 dB less and the impulse response stretch is thus less audible. The static version of this 2:1 concept has a small usable bandwidth of about one octave where the dispersion pattern is a cardioid or close to a cardioid. Fully passive cardioid subwoofers with two bass reflex elements in one speaker cabinet put into a specific configuration is also something that is in use.

End fire array is in another league with regards to sound quality and all elements of such an array combines in phase at the front of the array while they combine in chaotic phase and level on the rear side thus achieving rear cancellation. The drawback with this solution is the depth of the array which needs to be very deep, typically 4 m or more with regard to low frequencies for a static array configuration. Four or more modules in the array is the minimum and the industry standard for good performance. Adaptive end fire arrays with a lot of headroom per element can be configured with less depth for equally good performance, but a highly competent system engineer will be needed to operate such an array or calculations have to be done upfront.

DISCLOSURE OF INVENTION

It is one object of the invention to provide a loudspeaker system which do not suffer from the problems indicated above. By introducing a directional loudspeaker at least comprising: a loudspeaker cabinet containing a folded horn with a length of minimum one quarter of the longest wavelength to be reproduced, λ, and the horn mouth opening asymmetrically placed in the front baffle providing a physical delay between the different wraparound pathways to the rear side of the loudspeaker cabinet, a driver loading the horn with an open rear chamber, the open rear chamber having at least two opening pathways with a distance in between providing a physical delay of the rear wave. Said configuration providing at least four pathways for the in phase and out of phase signals, at least two pathways for the out of phase signal and at least two pathways for the in phase signal amplified by the horn, the at least four pathways providing physically different sound levels and delays with regards to a measurement point behind the loudspeaker cabinet on axis. The combination of these signals providing directionality making a sub cardioid dispersion pattern with 3-18 dB sound level decrease with typically 6-12 dB decrease on the rear side of the loudspeaker cabinet over its operating frequency range.

Other advantageous features will be apparent from the accompanying claims.

BRIEF DESCRIPTION OF DRAWINGS

Following is a brief description of the drawings in order to make the invention more readily understandable, the discussion that follows will refer to the accompanying drawings, in which.

DETAILED DESCRIPTION OF THE INVENTION

Figure 1:
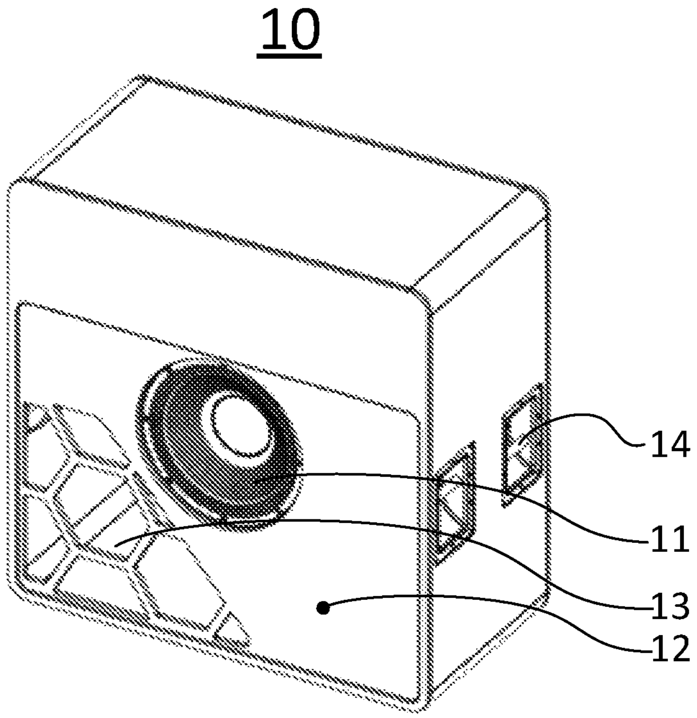
FIG. 1 shows front of a loudspeaker cabinet, front driver open rear chamber in centre of baffle, horn mouth opening with hexagon reinforcement in lower left corner.
Figure 2:
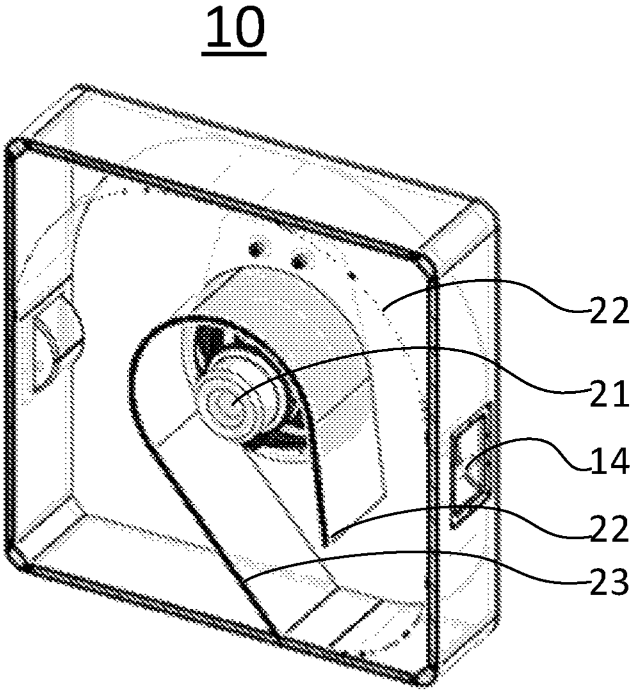
FIG. 2 shows section view cut with the centre plane of the loudspeaker cabinet showing the horn path from the magnet side of the drivers towards the horn opening in the lower left corner.
Figure 3:
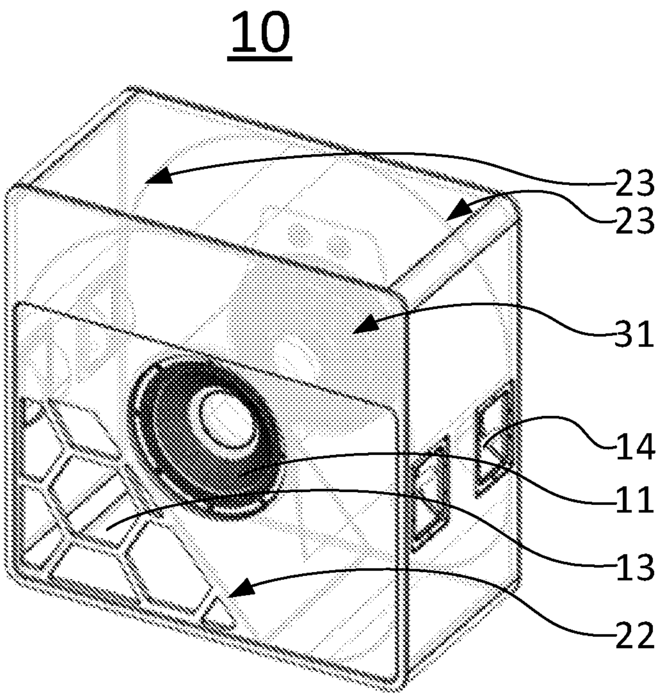
FIG. 3 shows front of the loudspeaker cabinet with hidden edges visible.
Figure 4:
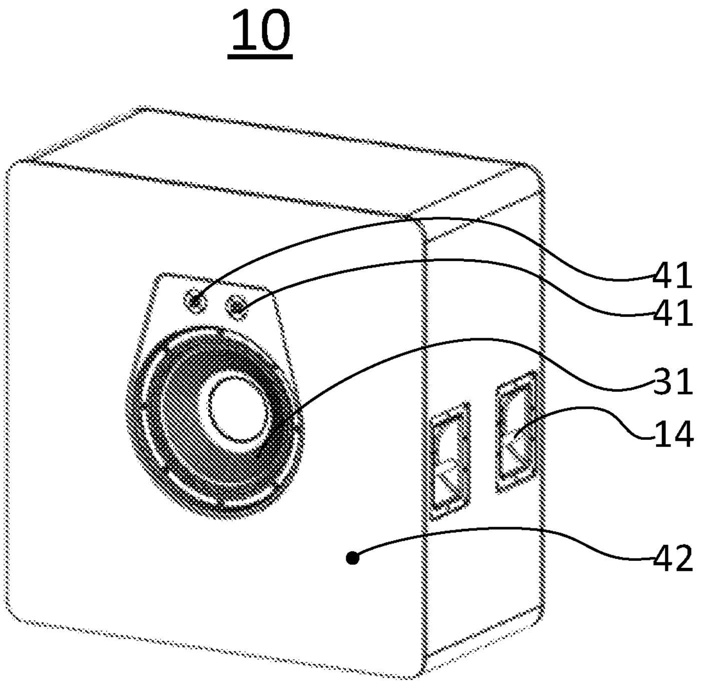
FIG. 4 shows rear side of loudspeaker cabinet with rear driver in centre of rear plate, open rear chamber.
Figure 5:
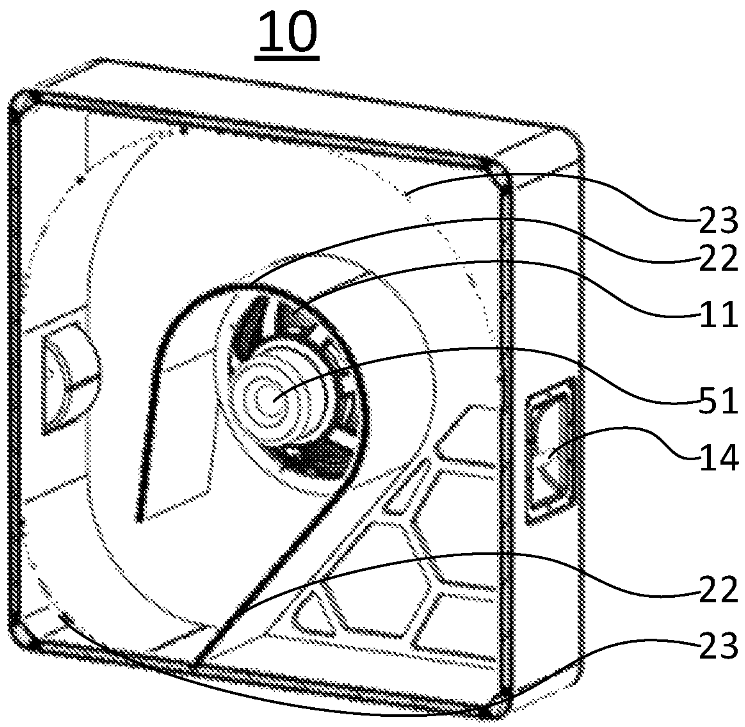
FIG. 5 shows a section view from the rear side cut with the centre plane showing horn path from the driver magnet side to the horn mouth opening in the lower right corner.
Figure 6:
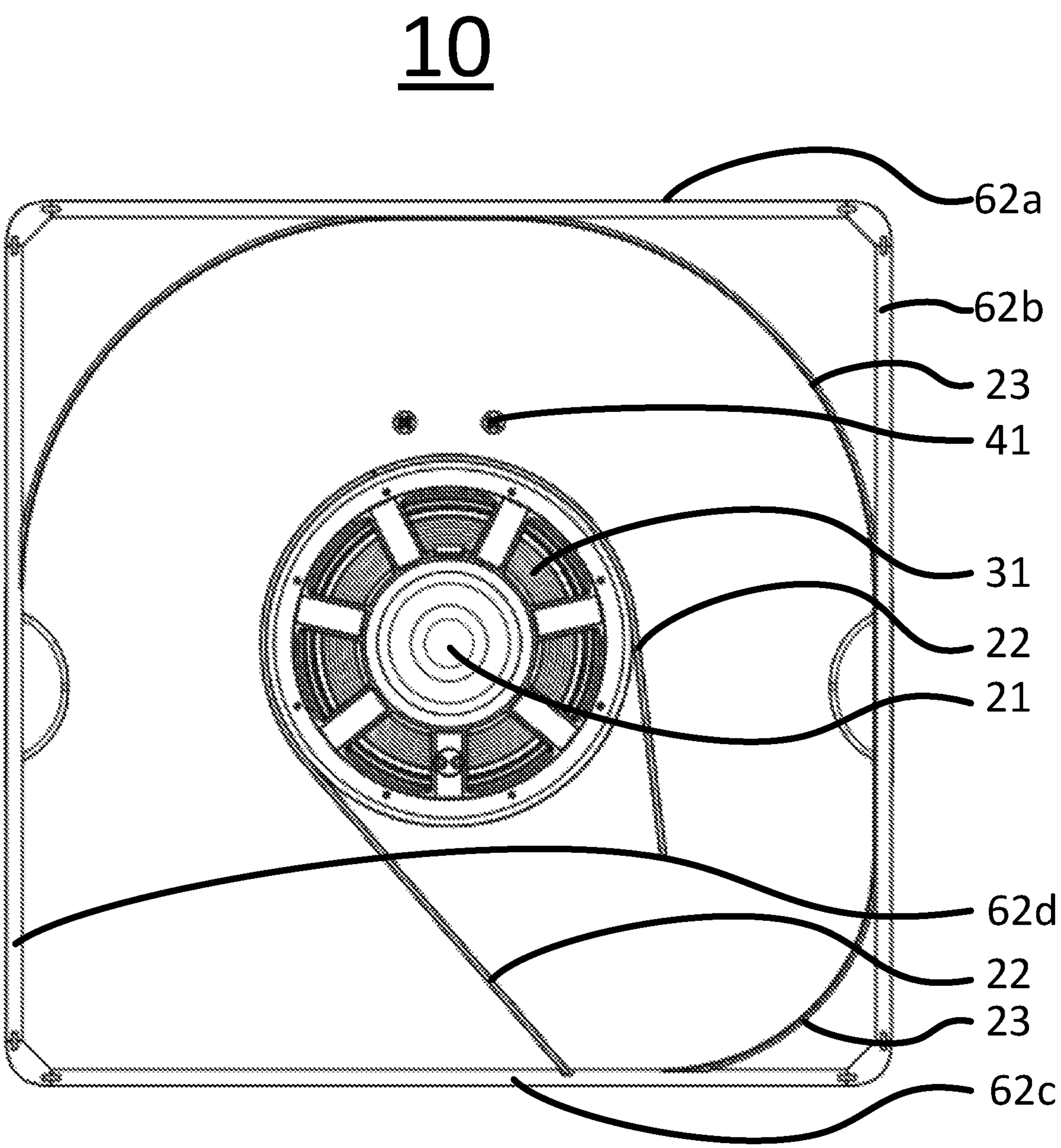
FIG. 6 shows a loudspeaker cabinet seen from the front, the interior of the loudspeaker cabinet is shown with a rear driver speaker, and an interior horn is shown with its inner and outer walls.

In the following it is firstly disclosed general embodiments in accordance to the present invention, thereafter particular exemplary embodiments will be described. Where possible reference will be made to the accompanying drawings and where possible using reference numerals in the drawings. It shall be noted however that the drawings are exemplary embodiments only and other features and embodiments may well be within the scope of the invention as described.

In the following description it will be adhered to the definitions below:

Loudspeaker cabinet, is a cabinet for a directional loudspeaker 10 according to the present invention excluding active elements and terminals 41.

The present invention provides a new concept to directional loudspeakers, an option that could be used with or without any dedicated signal processing for directional control. In addition the invention has everything needed in each module for directional control given by the physical design, thus providing a simple solution without the large size, processing and need for multiple elements of prior art.

To achieve directional control in a loudspeaker cabinet where the baffle size is smaller than the wavelengths it is reproducing a novel concept is presented: One or several drivers load the acoustic front side into a folded horn that has a length of minimum one quarter of the longest wavelength to be reproduced—a quarter-wave horn—with a horn mouth opening at the exterior of the cabinet, the acoustic front side of the drivers representing the input signal from an amplifier device, the acoustic rear side of this driver or drivers have their rear acoustic output which is the out of phase input signal from the amplifier device in an open or resistive rear chamber with at least two different pathways into free air outside the loudspeaker cabinet. By designing in the horn mouth asymmetrically placed on the baffle the sound that wrap around the loudspeaker cabinet from the horn mouth will have at least two different length pathways around the loudspeaker cabinet, and by adding the lower level out of phase rear wave of the driver or drivers coming from at least two different pathways the combined wave on the rear side of the loudspeaker cabinet will have significantly decreased level compared to the front wave. Depending on the design a broad band level decrease within the operating range in the amount of 3-18 dB for the on axis rear wave compared to the on axis front wave has been calculated.

The level and positioning of the direct radiating paths can be tuned with resistive material and/or geometrical positioning and/or shape of the pathways. The horn mouth opening positioning in the loudspeaker cabinet can be used to tune the path lengths and number of pathways around the loudspeaker cabinet for the wraparound sound.

An example embodiment of said directional loudspeaker cabinet: Two drivers with open back rear chambers meeting free air mounted on the front and rear centreline of the loudspeaker cabinet, driving a folded horn with the horn mouth asymmetrically placed in the front baffle. In this configuration the rear wave on axis consists of four sound sources combining; source one starting at 0 ms is the rear driver open chamber, source two is the front driver open chamber with approximately 3 ms physical delay caused by wrapping sound around the loudspeaker cabinet, source four is the horns short pathway wrapping around the loudspeaker cabinet which is delayed by approximately 15 ms, source four is the horns long pathway wrapping around the loudspeaker cabinet which is delayed by approximately 18 ms.

On the front side the sound pressure from the horn is significantly louder than from any of the drivers open rear chambers since the drivers combine into the horn with their acoustic front sides and are physically far apart on the outside of the loudspeaker cabinet with their acoustic rear sides.

A prototype of this example embodiment has been measured and the average level decrease of the rear wave within the operating range of 23-100 Hz was about 7 dB with no signal processing involved for a standalone unit.

| | |
|---|---|
| 10 | Directional loudspeaker i.e. horn loaded loudspeaker cabinet with one or more speaker drivers |
| 11 | Front driver element/front driver speaker |
| 12 | Front baffle |
| 13 | Horn mouth, in one embodiment hexagon reinforced |
| 14 | Loudspeaker cabinet handle |
| 21 | Magnet rear driver element/magnet rear driver speaker |
| 22 | Inner sidewall of horn |
| 23 | Outer sidewall of horn |
| 31 | Rear driver element/rear driver speaker |
| 41 | Contact terminals |
| 42 | Rear baffle |
| 51 | Magnet front driver element/magnet front driver speaker |
| 62a | First outer wall of loudspeaker cabinet |
| 62b | Second outer wall of loudspeaker cabinet |
| 62c | Third outer wall of loudspeaker cabinet |
| 62d | Fourth outer wall of loudspeaker cabinet |
| λ | λ, represents the longest wavelength the loudspeaker cabinet is configured to reproduce, this will be between 3-3000, and typically 16-300 Hz |

The invention claimed is:

1. A directional loudspeaker comprising:

a) a loudspeaker cabinet comprising:

i. one folded horn with a minimum length of one quarter of a wavelength, λ, wherein the wavelength is the longest wavelength the loudspeaker cabinet is configured to reproduce, and wherein the horn mouth opening is asymmetrically placed in a front baffle providing a physical delay of sound waves between different wraparound pathways to the rear side of the loudspeaker cabinet;

ii. one or more driver speakers loading the horn with an open back rear chamber, the open back rear chamber having at least two opening pathways with a distance there between providing a physical delay of a rear sound wave.

2. The directional loudspeaker of claim 1, wherein the loudspeaker cabinet comprises two driver speakers loading the horn.

3. The directional loudspeaker according to of claim 2, wherein the loudspeaker cabinet comprises two driver speakers with open back rear chambers meeting free air mounted on the front and rear centreline of the loudspeaker cabinet.

4. The directional loudspeaker of claim 1, wherein the loudspeaker cabinet comprises at least four pathways for in phase and out of phase signals, at least two pathways for the out of phase signal, and at least two pathways for the in phase signal amplified by the horn.

5. The directional loudspeaker of claim 1, where the loudspeaker cabinet comprises multiple driver speakers loading the horn.

6. The directional loudspeaker of claim 1, where the loudspeaker cabinet further comprises at least one resistive rear chamber path.

7. The directional loudspeaker of claim 1, where the loudspeaker cabinet further comprises two or more resistive rear chamber paths.

8. The directional loudspeaker of claim 1, where the loudspeaker cabinet further comprises resistive rear chamber paths for all rear chamber paths.

* * * * *